United States Patent
Astigarraga et al.

(10) Patent No.: US 8,127,099 B2
(45) Date of Patent: Feb. 28, 2012

(54) RESOURCE RECOVERY USING BORROWED BLOCKS OF MEMORY

(75) Inventors: Tara Astigarraga, Tucson, AZ (US); Michael E. Browne, Staatsburg, NY (US); Joseph Demczar, Salt Point, NY (US); Eric C. Wieder, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/616,116

(22) Filed: Dec. 26, 2006

(65) Prior Publication Data

US 2008/0155553 A1 Jun. 26, 2008

(51) Int. Cl.
*G06F 12/00* (2006.01)

(52) U.S. Cl. ........ 711/170; 711/154; 711/161; 711/162; 711/173; 714/6.1; 714/6.12; 718/108

(58) Field of Classification Search .................. 711/154, 711/161–162, 170, 173; 714/6.1, 6.12; 718/108
See application file for complete search history.

(56) References Cited

U.S. PATENT DOCUMENTS

| | | | | |
|---|---|---|---|---|
| 4,930,128 A | * | 5/1990 | Suzuki et al. | 714/16 |
| 5,809,542 A | * | 9/1998 | Tsuboi et al. | 711/162 |
| 5,884,019 A | * | 3/1999 | Inaho | 714/6.1 |
| 6,088,777 A | * | 7/2000 | Sorber | 711/171 |
| 6,381,682 B2 | * | 4/2002 | Noel et al. | 711/153 |
| 6,442,661 B1 | * | 8/2002 | Dreszer | 711/170 |
| 6,687,799 B2 | * | 2/2004 | Smullen et al. | 711/154 |
| 7,308,609 B2 | * | 12/2007 | Dickenson et al. | 714/36 |
| 7,509,521 B2 | * | 3/2009 | Iwakura et al. | 714/5 |
| 2005/0240806 A1 | * | 10/2005 | Bruckert et al. | 714/6 |
| 2005/0257020 A1 | * | 11/2005 | Kashyap et al. | 711/170 |
| 2006/0179218 A1 | * | 8/2006 | Burkey | 711/114 |

* cited by examiner

*Primary Examiner* — Arpan P. Savla
(74) *Attorney, Agent, or Firm* — Jon A. Gibbons; Fleit Gibbons Gutman Bongini & Bianco PL

(57) ABSTRACT

Disclosed are a method, information processing system, and computer readable medium for resource recovery. The method comprises associating at least one bit with at least one block of memory. The bit denotes a borrow status for the block of memory. The bit is set for resource recovery. A resource recovery event is detected and in response to the bit being enabled for resource recovery, the block of memory is borrowed for a given duration of time. The block is borrowed to temporarily store information associated with the resource recovery there into until the information is written to persistent storage.

20 Claims, 5 Drawing Sheets

US 8,127,099 B2

RESOURCE RECOVERY USING BORROWED BLOCKS OF MEMORY

FIELD OF THE INVENTION

The present invention generally relates to the field of information processing systems, and more particularly relates to managing recovery actions for an information processing system.

BACKGROUND OF THE INVENTION

Typical computer system designs handle operating system ("OS") crashes in the following way. After an operating system crashes the memory image that is resident in memory is copied with symbol definitions for various data structures in the OS image to a predefined disk location. This copying is performed prior to returning control back to the system administrator. This process is normally referred to as a system dump. While the memory image is being copied, that operating system image and CPU resources are not available and a lengthy system outage can occur. A system dump in typical systems with real memory sizes in the tens and hundreds of Gigabytes can take hours to complete. The CPU and memory resources need to be exclusively used during this operation to avoid the dump data from being modified and allow the diagnostic data in the dump to be preserved on persistent storage. The reipl of the crashed operating system is serialized behind the system dump operation thus causing a potentially long system outage.

Therefore a need exists to overcome the problems with the prior art as discussed above.

SUMMARY OF THE INVENTION

Briefly, in accordance with the present invention, disclosed are a method, information processing system, and computer readable medium for resource recovery. The method comprises associating at least one bit with at least one block of memory. The bit denotes a borrow status for the block of memory. The bit is set for resource recovery. A resource recovery event is detected and in response to the bit being enabled for resource recovery, borrowing the block of memory for a given duration of time. The bit is borrowed to temporarily store information associated with the resource recovery there into until the information is written to persistent storage.

In another embodiment an information processing system for resource recovery is disclosed. The information processing system comprises a memory and a processor that is communicatively coupled to the memory. The information processing system also comprises a partition control module that is communicatively coupled to the memory and the processor. The partition control module is for associating at least one bit with at least one block of memory. The bit denotes a borrow status for the block of memory. The bit is set for resource recovery. A resource recovery event is detected and in response to the bit being enabled for resource recovery, borrowing the block of memory for a given duration of time. The bit is borrowed to temporarily store information associated with the resource recovery there into until the information is written to persistent storage.

In yet another embodiment, a computer readable medium for resource recovery is disclosed. The computer readable medium comprises instructions for associating at least one bit with at least one block of memory. The bit denotes a borrow status for the block of memory. The bit is set for resource recovery. A resource recovery event is detected and in response to the bit being enabled for resource recovery, borrowing the block of memory for a given duration of time. The bit is borrowed to temporarily store information associated with the resource recovery there into until the information is written to persistent storage.

One advantage of the present invention is that the outage time caused by a system dump is significantly reduced and higher system availability levels are obtained. The present invention takes advantage of the collocation of both server and storage controller resources in the same computer, thereby allowing the large read cache of the storage controller to be temporarily reallocated. This temporary reallocation allows a re-IPLed server image to be loaded while the memory image is being copied to disk. Other memory usages that lend it to being temporarily taken from their primary use can also be used in addition to storage controller read cache, which allows the present invention to be applied to virtualized environments as well.

Another advantage of the present invention is that outage times from a system crash can be reduced by utilizing specific configuration parameters and additional real memory data structures. These configuration parameters and data structures allow the controlling firmware in the computer to better allocate real memory during system dumps and other long running recovery operations that hold memory and CPU resources for an extended period of time.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one as or more than one. The term plurality, as used herein, is defined as two as or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Exemplary Computing Environment

Figure 1:
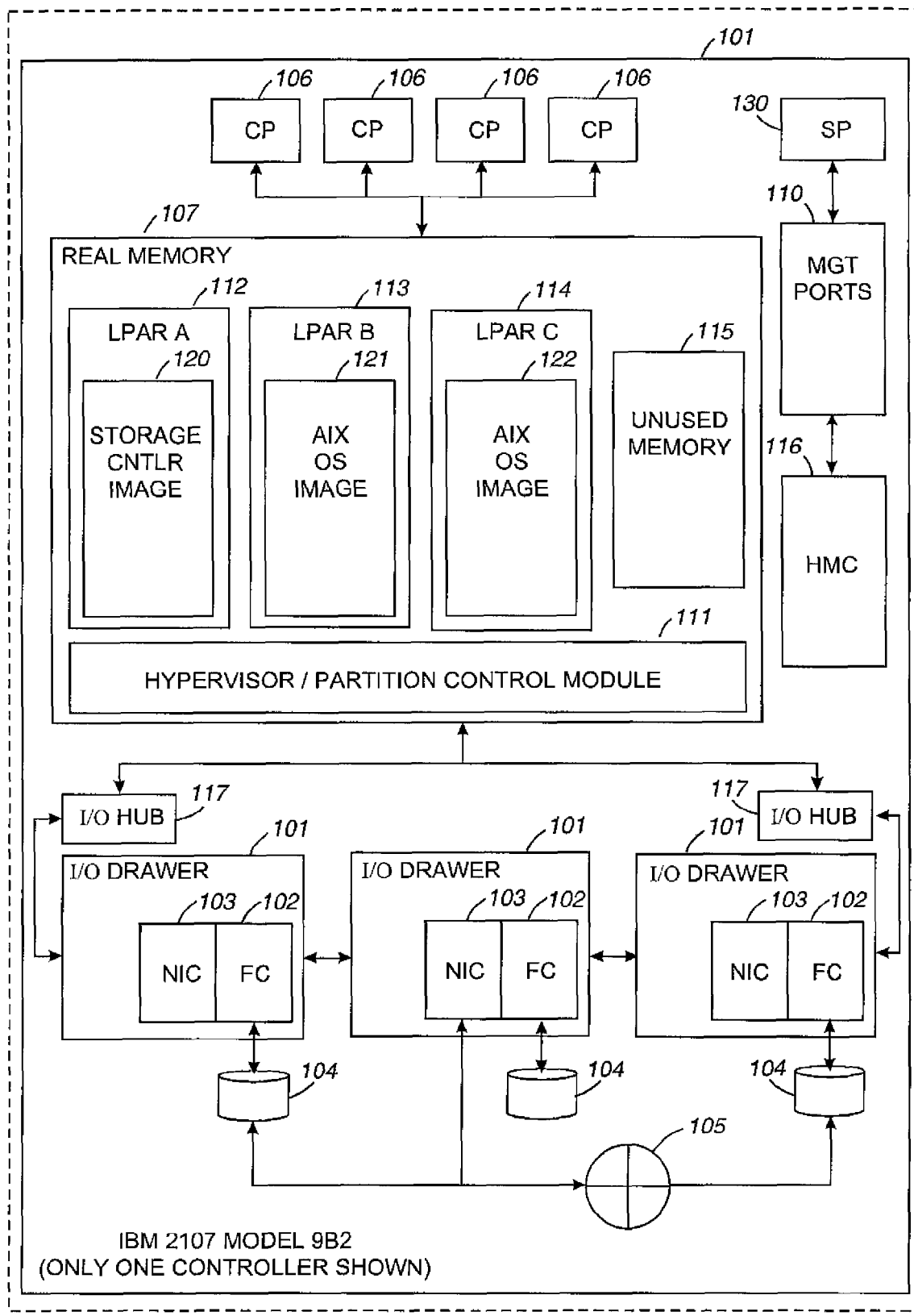
FIG. 1 is a block diagram illustrating an exemplary computing environment according to an embodiment of the present invention.

FIG. 1 shows an exemplary computing environment 100, which embodiments of the present invention may be implemented. In one example, the computing environment 100 is a distributed computing environment that is instantiated in an IBM 2107 Model 9B2 Enterprise DS8000 Disk Subsystem as shown in FIG. 1. It should be noted that the present invention is not limited to an IBM 2107 Model 9B2 Enterprise DS8000 Disk Subsystem, which is used herein as only one example. The example shown is only one controller of that disk subsystem. A second coupled controller is part of a 2107 system, but is not shown for simplicity. It should be noted that the present invention is also applicable to both single system and distributed computing environments.

In one embodiment, the computing environment 100 is a single SMP computing environment with a plurality of logical partitions in which an operating system image is instantiated. In an SMP computing environment, parallel applications can have several tasks (processes) that execute on the various processors on the same processing node. The computing environment 100 executes on a plurality of processing nodes 112, 113, 114 coupled to one another node via a plurality of network adapters 103. Each processing node 112, 113, 114 is independent with its own operating system image 120, 121, 122. Each logical partition ("LPAR") 112, 113, 114 shares the plurality of processing units 106 in a manner referred to as micropartitioning where processing units can be time sliced by the hypervisor 111 on the same processing unit 106. In other embodiments, the processors 106 do not have to be shared. Each LPAR includes all of its own processor states and register contents L1, L2 and L3 caches in the processing unit can be shared or dedicated depending on the implementation across the LPARs allowed to execute on these specific processing units 106. Each LPAR 112, 113, 114, hypervisor 111, as well as unused or unallocated memory 115 are included within the real memory 107 subsystem of the system 100. In an exemplary embodiment this is 256 Gigabytes of addressable memory.

The hypervisor 111 is the controlling element of the LPARs 112, 113, 114 in terms of memory mapping, context switching from one LPAR to another on shared CPUs, and is generally involved in all communications from the software to the real hardware. The connections between the CP units 106 and real memory 107 are via a memory bus and memory controller as found on a general purpose computer. The service processor 130 is a control and device initialization processor that includes its own wired electrical network to most of the components in the computing environment 100. These lines are not shown here for simplicity. Block 110 is a connection block that allows network ports that are used for the Hardware Management Console ("HMC") 116. This console is used by the system administrator to set configuration values like partition size and type as well as policy choices like allowing a particular partition to allow memory borrowing.

Although only four processors 106 are shown, fewer or more processors can be utilized in variations of this embodiment. In some embodiments, the various LPARS 112, 113, 114 are able to be part of a processing cluster. All of these variations are considered embodiments of the present invention.

Figure 2:
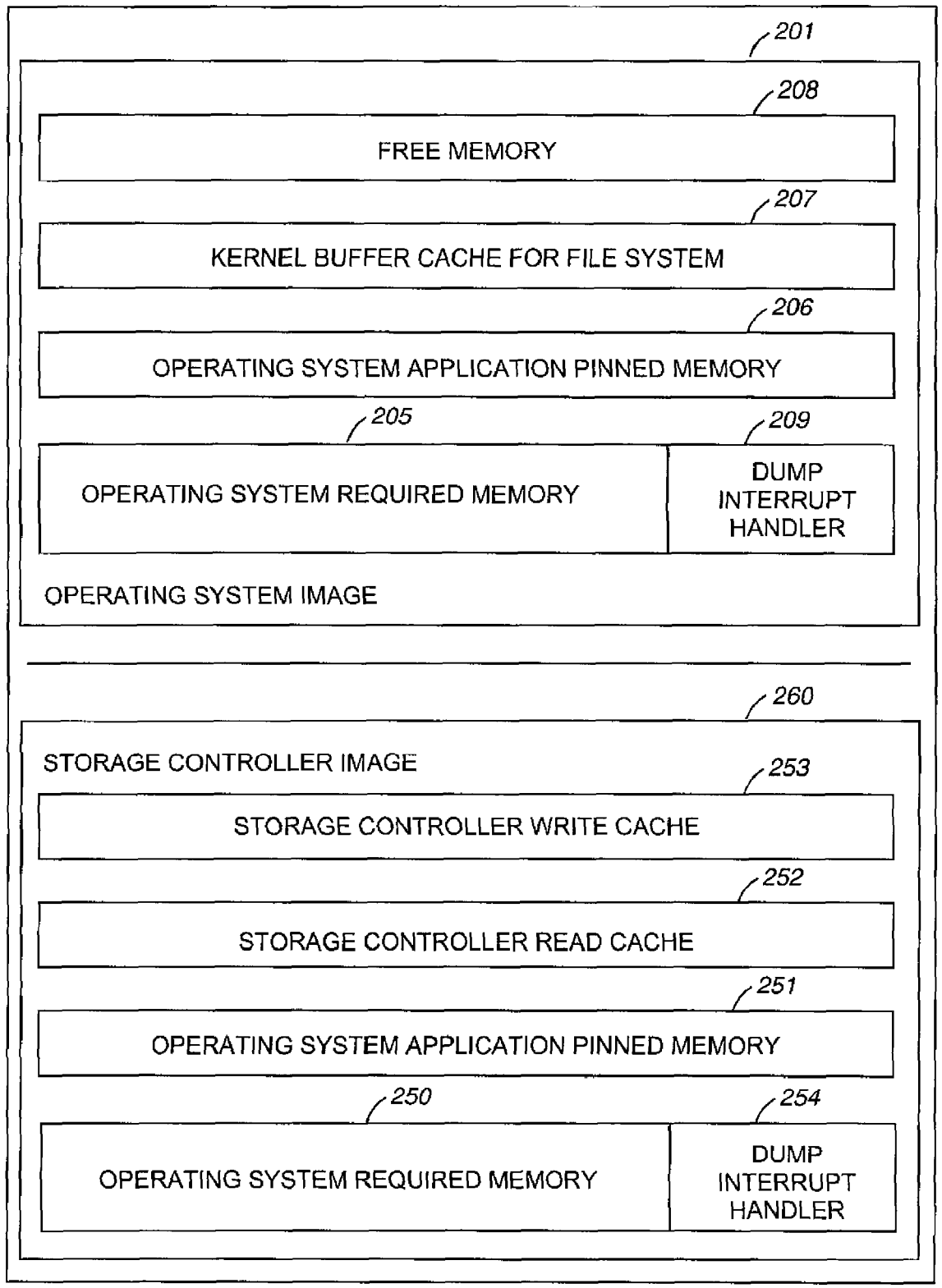
FIG. 2 is a high level memory allocation map of both a UNIX server image and a storage controller image that shows areas of memory that are desirable to use for memory borrowing according to an embodiment of the present invention.

FIG. 2 is a block diagram showing an overview of a memory map for a typical operating system image in the computing environment 100. It should be noted that other embodiments of this invention can have more or less memory allocations of both size and type. In the upper half 202 of FIG. 2 an operating system image 201 is depicted. Operating systems typically have a required amount of memory that can be set in size of calculated by the operating system based on resources and functions that have been configured for use in the operating environment. This range of real memory would typically not be enabled for memory borrowing by the hypervisor 111.

Block 209 represents the interrupt handler program that is part of the operating system that can be invoked as part of this invention. This is the program that is executed after a system crash or user initiated system dump. Block 206 is memory that is used by applications like databases that have buffer pools that are pinned in real memory so they are not paged out. This range of real memory is typically not enabled for memory borrowing by the hypervisor 111. Block 207 is memory that is used for kernel buffer cache as in a typical UNIX or Linux operating system. This memory typically includes many real memory pages that are used for just reading of disk blocks in memory. This range of real memory is typically enabled for memory borrowing by the hypervisor 111. Block 208 is free memory that is currently allocated but not used by the operating system as a free pool of memory to handle future demand page requests. This range of real memory is typically enabled for memory borrowing by the hypervisor 111

The hypervisor 111 is responsible for real memory management, mapping, and allocation to the individual LPARS 112, 113, 114. In order to do memory management and mapping a data structure typically called a page table is used. Each entry in a page table holds information or a pointer to information about each page. In one embodiment of the present invention, a new bit called the "enable for borrowing" bit hereinafter referred to as the "borrow bit" is used to inform the hypervisor 111 which real memory pages can be borrowed. The operating system 122, Storage Controller Image 120, and HMC 116 configuration call the hypervisor on initialization and appropriate state changes of real memory pages to set the borrow bit or bits on or off.

The combination of FIG. 1 and FIG. 2 comprises a detailed view an information processing system 101 for use in a computing environment 100 such as that shown in FIG. 1. However, it should be noted that the following discussion is also applicable to a personal computer (e.g., desktop or notebook), a workstation, or the like. In other words, any suitably configured processing system is similarly able to be used as the information processing system 101 in further embodiments of the present invention. The information processing system 101 includes a computer 201 and 260.

The information processing system 101 also includes one or more processors 106 that are communicatively coupled to the main memory 107 and the I/O subsystem 117, 101, 103, and 102 via the I/O bus. The main memory 107 can be either is volatile memory such as random access memory ("RAM")

or non-volatile memory. It should be noted that any of the components residing in the main memory 107 may be stored in non-volatile memory such as the DASD 104, electrically erasable programmable read-only memory space ("EEPROM" or "Flash memory"), RAM drives, and the like. The information processing system 101 also includes a mass storage interface 102, terminal interface 116, I/O adapter slots 101, and network adapter hardware 103. An input/output bus between the I/O hub 117 and I/O drawer 101 connects these components.

The mass storage interface 102 is used to connect mass storage devices such as data storage device 104 to the information processing system 101. One specific type of data storage device is a computer readable medium such as a Compact Disc ("CD") drive, which may be used to store data to and read data from a CD or DVD. Another type of data storage device is a hard disk configured to support, for example, JFS2 type file system operations. In one embodiment, the mass storage I/F includes a storage controller read cache 252, which is discussed in greater detail below.

The terminal interface 116 is used to directly connect a console to the information processing system 101 to provide a user interface to the computer 100. Terminals, which are able to be non-intelligent or fully programmable workstations, are used to allow system administrators and users to communicate with the information processing system 101. These terminals are not shown form simplicity. The terminals are also able to include user interface and peripheral devices that are connected to information processing system 101 and. The user interface and peripheral devices are controlled by terminal interface hardware included in the terminal. The user interface and peripheral devices can include video adapters and interfaces for keyboards, pointing devices, and the like.

The network adapter hardware 103 and 105 provides an interface to a network (not shown) for implementing data communications with other computers Such data communications may be carried out, for example, through data communications networks such as IP networks or in any other way. Network adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11 adapters for wireless network communications. Embodiments of the present invention are able to be adapted to work with any data communications connections including present day analog and/or digital techniques or via a future networking mechanism.

The main memory 107 comprises a hypervisor 111, one or more logical partitions ("LPAR") such as Partition A 112, Partition B 113 and Partition C, a hypervisor 111, and a memory pool 115. It should be noted that other components can reside within main memory 107 that are not shown. The memory pool 115, in one embodiment, is a pool of unused memory that is available to each of the partitions 112, 113, 114. The hypervisor 111, in one embodiment, can reside within firmware and controls the creation, deletion, and management of logical partitions. The hypervisor 111, in one embodiment, includes a recovery logic, which is discussed in greater detail below. The logical partitions 112, 113 and 114, in one embodiment, are a set of data structures and services that enable distribution of computer resources within a single computer to make the computer function as if it were two or more independent computers. Each logical partition is assigned all the resources it needs to operate as though it were an independent computer, including processor time, memory, an operating system, and the like.

The hypervisor 111 is a layer of system software that runs under the operating system 120, 121, 122 of logical partitions 112, 113, 114. That is, a hypervisor 111 runs between an operating system 120, 121, 123, and underlying physical computer components including physical processors 106. It is the function of the hypervisor 111, among other things, to schedule virtual processors on physical processors 106. The OS 120, 121 and 122 of each partition 112, 113, 114 is a layer of system software that schedules threads and provides functions for making system resources available to threads, including memory access, access to input/output resources, and the like. The OS 120, 121, 122 also controls allocation and authorization for access to computer resources. The OS 120, 121, 122 performs low-level basic tasks such as recognizing input from a keyboard, sending output to a display screen, keeping track of files and directories on a magnetic disk drive, and controlling peripheral devices such as disk drives and printers.

The OS 120, 121, 122 is also responsible for security, ensuring that unauthorized users do not access the system and that threads access only resources they are authorized to access. Operating systems useful for scheduling threads in a multi-threaded computer according to embodiments of the present invention are multi-threading operating systems, examples of which include UNIX™, Linux™, AIX™, IBM's i5OS, and many others.

In one embodiment, Partition B 113 can comprise a general purpose OS image such as the AIX OS and Partition A 112 can include a storage controller image. Each of the partitions 112, 113, 114 also includes memory 201, 250 comprising one or more memory blocks 205, 205, 207, 208, 209, 250, 251, 252, 253. The OS 120, 121, 122 of each partition 112, 113, 114 is initialized by performing an initial program load ("IPL"). When the IPL is performed, the majority of real memory blocks 208, 207, 252 of the partitions 112, 113, 114 are set with a "borrow bit" enabled (e.g., set to "1") or disabled (e.g., set to "0") depending on the needs of the OS 120, 121, 122. In one embodiment, the real memory blocks of Partition A 112, which includes a storage controller image, can be part of a large read cache such as the storage controller read cache 252. Most operating systems have an absolute minimum size for real memory and these blocks are not enabled for borrowing.

A "borrow bit", in one embodiment, is a data structure control bit that informs the hypervisor 111 if the corresponding memory block can be borrowed for a recovery action such as a system dump. Also, additional bits may be included for the memory blocks 208, 207, 252 that indicate how long a block can be borrowed for, what type of recovery action the memory block can be borrowed for, and the like. These bits can be in the page table data structure for the hypervisor 111. A "borrow bit" can be set based on operating system requests, application configuration, system administrator policies, and the like.

The hypervisor 111 accepts the interface call from the partition 112, 113, 114 to set the "borrow bit" and performs the necessary updates to the appropriate data structures. The hypervisor 111 can also update either a list or pointer to a list that includes addresses of the page or page ranges that can be borrowed. The hypervisor 111 can also monitor the total number of memory blocks that can be borrowed. An OS 120, 121, 122 can also request for the status of a "borrow bit" to be updated For example, if an OS 120, 121, 122 requires specific pages to be kept in real memory (e.g., pinned memory request) that were previously made available to be borrowed, the status of these pages can be updated from "borrow bit" enabled to "borrow bit" disabled. In this situation, the hypervisor 111 updates the appropriate data structures for the memory blocks associated with the status change.

If an event occurs such as an OS crash, the dump interrupt handler 209 is invoked by the partition where the event occurred. For example, consider an example where the OS image 121 of Partition B 113 crashes. The dump interrupt handler 209 of Partition B calls the recovery logic residing in the hypervisor 111 to post the event. The recovery logic then starts a recovery action mode. The hypervisor 111 determines whether to freeze the partition image or inform the dump interrupt handler 209 to perform normal system dumping procedures. The hypervisor 111 analyzes the configuration of the partitions and determines if a fast system ipl can be completed. A fast ipl, in one embodiment, is an ipl of a new copy of the failed partition in parallel with the system dump of the failed partition to persistent storage.

The new copy of the failed partition is ipled into a combination of unused memory 115, borrowed memory 207, 208, 252 and reclaimed memory 113 as the failed partition memory is being freed up by the dump in progress. In one embodiment, the recovery logic in the hypervisor 111 determines if the partition is configured to allow fast ipl and how much memory needs to be allocated, borrowed, and reclaimed to perform the fast ipl. This required amount of memory can be determined from the partition configuration parameters that were defined in the HMC 116 and the page table and related data structures in the hypervisor 111. Once the decision has been made to do the fast IPL the recovery logic in hypervisor 111 also activates a predefined partition in this case Partition C which is reflected in the HMC 116 configuration and then moves Partition B I/O adapters to Partition C. The combination of the memory reallocation and borrowing and I/O moves to a predefined Partition provide for the total resources needed to fast IPL the failed partition.

Once a recovery event has been posted to the hypervisor 111 it then determines the amount of unused memory available within the unused area 115 and the memory available at the other partitions such as Partition A 252. For example, after a system crash of Partition B 113 the hypervisor 111 determines if enough memory exits between unused memory in 115 and the borrowing enabled read cache of the storage controller image of Partition A 252. It compares the available amount to the minimum required amount defined in the HMC 116 configuration and if the available memory meets or exceeds the amount defined as a minimum it starts the fast ipl. If it does not met it the hypervisor 111 looks for additional borrow enabled memory blocks from other partitions in a policy defined order from the HMC configuration. In one embodiment, the information processing system 101 can include unused pool of memory, which is by default enabled for borrowing and the memory allocated for borrowing by the various partitions 112, 114. If the partition is not allowed to do fast ipl or there is not enough memory available between the two partitions to get the memory needed for the crashed OS image the firmware returns a value that allows the dump interrupt program to continue with normal system dump processing.

If the partition (Partition B 113 in this example) is configured for fast ipl and there is enough available memory, recovery logic in the hypervisor 111 can perform the system dump and IPL of the crashed OS image 113 in parallel. The first action is to return a freeze value to the crashed OS image 113 and the hypervisor 111 borrows memory blocks via dynamic partition operations if needed. For example, after freezing the OS image 113, the hypervisor 111 determines if there is enough memory to start the IPL of the crashed OS image 113 and finish it without reducing the storage controller read cache 252. If enough memory does exist without using storage controller read cache for a full OS image, the IPL is started. When the IPL is completed productive work can resume.

One advantage of using storage controller read cache is that this memory can be used for a short period of time without adversely affecting the operation of in progress or future disk writes, other LPAR memory performance and only a degradation of disk reads will occur. Given that in this example the failed partition B 113 most likely had some amount of the storage controller read cache in use just previous to its crash event. The contents of that read cache, in this example, are no longer valid thus making the reduction in read cache for some amount of it having no affect on performance at all. If enough memory does not exist, a second action of copying the memory image of the crashed OS image 110 to persistent storage is performed.

Once the decision has been made to do the fast IPL, the recovery logic in the hypervisor 111 also activates a predefined partition (Partition C in this example). This is reflected in the HMC 116 configuration and the hypervisor 111 then moves Partition B I/O adapters to Partition C. The combination of the memory reallocation/borrowing and the moving of I/O adapter to a predefined Partition provide for the total resources needed to fast IPL the failed partition.

The process of reclaiming memory from the crashed OS partition B 113 in this example has a benefit in that there may be enough memory to meet the minimum memory requirements between unused memory 115 and storage controller read cache 252, but the desired amount of memory may not be met. The hypervisor 111 can start the fast ipl of the new copy of Partition B and in parallel perform data moves to preconfigured persistent storage 104 from the crashed OS partition B. The CPU state, registers, and the memory image are copied to this device.

As a page or range of pages is copied over, the hypervisor 111 makes those pages available for the re-IPL of the crashed partition (Partition B 113) OS. This continues until the entire image is copied over to the persistent storage 104. Therefore, a fast IPL operation can be performed at the same time and get the new partition configured to desired memory requirements in a shorter period of time. Additionally the reclaim process can start returning borrowed memory back to Partition A storage controller read cache 252 and then unused memory 115 further reducing the impact of the outage to the total system environment.

The desired memory size can be obtained while the partition is being IPLed or even subsequent to IPL is there is a lag in getting all the memory available from the borrow pool or the copying of Partition B's memory image to persistent storage. Partition C 114 can also have optional "borrow bits" set in memory blocks residing in its memory 207. These "borrow bits" and memory blocks have not been shown in Partition C 114 for simplicity.

Once the OS image 113 from Partition B is copied to persistent storage 210, a status message is posted, for example, in the form of a specialized device error to the OS image 110 that the OS image copy to disk is complete. In one embodiment, an automated or manual task is initiated by the hypervisor 111 based on the error from the specialized device in the OS image. This task brings the crashed OS image device on-line as one of its devices. The copying and formatting of the data from the crashed OS image is started as a normal system dump with appropriate companion data from the operating system such as symbol tables etc. The OS image releases the crashed memory image device back to the storage controller via a vary-off-operation and a special command to the storage controller.

Once the completion code is received, the memory from the crashed OS image is returned to the appropriate owning partitions(s) via dynamic partition operations. For example, the recovery logic in the hypervisor 111 determines if it needs to perform a memory calculation for determining how much memory needs to be returned to the copied OS image 120, storage controller read cache 252 and available memory such as the memory pool 115. If any memory is still needed for the copied OS image 113 for getting the image to desired state. Then the hypervisor 111 dynamically adds this memory to the OS image 113. The hypervisor 111 returns any excess memory from the OS image 113 to available unused memory 115. One or more of these memory re-allocations steps can be performed in parallel or in serial with one another. When all the pages are returned to their respective owners, the hypervisor 111 deletes Partition B's definition and renames partition C 240 to Partition B.

As can be seen, the present invention reduces system outage time during a recovery action such as a system crash. The present invention provides communication between virtualized partitions 112, 113, 114 and a hypervisor 111 via additional data structure control bits. The control bits are located in the real memory allocation structures of the hypervisor 111 of which real memory blocks can be borrowed from a primary owning partition for use during a recovery operation such as a system dump. The equivalent or the same real memory blocks are then given back to the primary owning Partition After the completion of the recovery action. Each memory block or group of pages can have an additional bit or bits that inform the hypervisor 111 if this page can be borrowed for a recovery operation, i.e., "borrow bits". Although one bit is sufficient to determine if a page can be borrowed, additional bits can be used to further classify how long something can be borrowed. One embodiment can have as many bits as it has lengths and or classes of recovery actions. These classes can be categorizes as being recovery actions in minutes or hours as a type of grouping.

Once a recovery action event takes place in a properly configured computer with virtualized resources the hypervisor 111 can via list structures or pointers to structures borrow memory resources and CPU resources to enable the faster re-IPL of the failed partition while preserving the old memory image of the failed partition. In parallel with the re-IPL, the failed partition memory image can be written to persistent storage. Once the failed partition memory image has been written to persistent storage the partition control module 214 can then "return" the borrowed pages to their previous owners dynamically thus restoring full system function and performance.

Although the exemplary embodiments of the present invention are described in the context of a fully functional computer system, embodiments are capable of being distributed as a program product via a CD 210 and its equivalents, floppy disk, or other form of recordable media, or via any type of electronic transmission mechanism.

Process of Setting "Borrow Bits"

Figure 3:
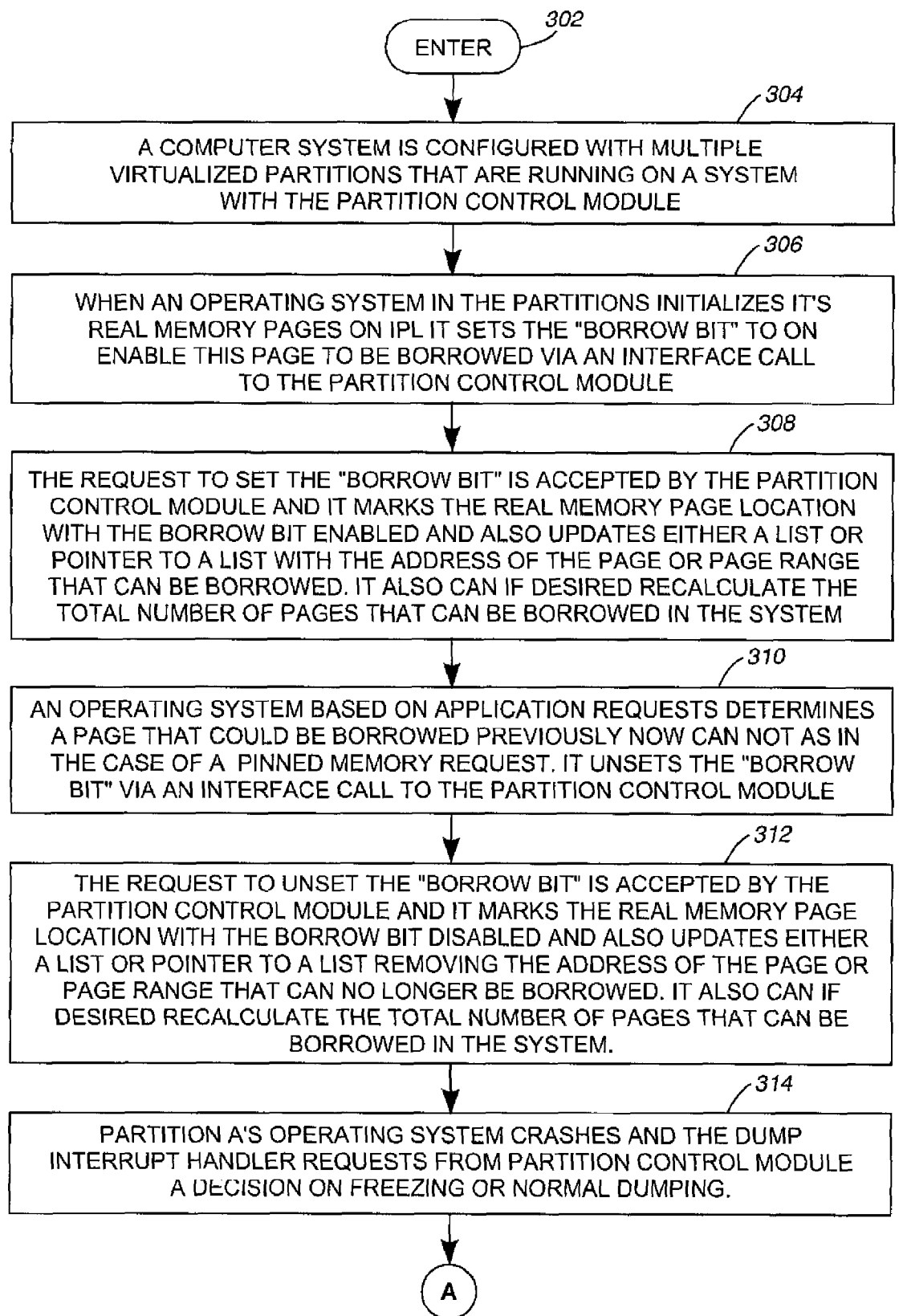
FIG. 3 is an operational flow diagram illustrating an exemplary process of enabling (or disabling) the borrowing of one or more memory blocks for use in a recovery action according to an embodiment of the present invention.

FIG. 3 is an operational flow diagram illustrating a process of setting "borrow bits" for a fast system dump procedure. The operational flow diagram of FIG. 3 begins at step 302 and flows directly to step 304. An information processing system 101, at step 304, is configured with multiple virtualized partitions such as Partition A 112 and Partition B 113. Each partition 112, 113, 114, at step 306, is IPLed, which initializes the real memory blocks 205, 206, 207, 208, 250, 251, 252, 253 of each partition 112, 113, 114. Also, a "borrow bit" is either enabled or disabled for each memory block or range of memory blocks.

The partition control module or hypervisor 111, at step 308, accepts the request to set the "borrow bit" marks the real memory page location via the page table entry with the borrow bit enabled. The partition control module 111 also updates either a list or pointer to a list with the address of the page or page range that can be borrowed. The partition control module can also recalculate the total number of pages that can be borrowed in the information processing system 101.

The partition control module 111, at step 310, can also receive a request from each operating system in partition A 112 and partition B 113 to have specific pages kept in real memory. In other words, the operating systems 120, 121 request to have an enabled "borrow bit" of a memory block changed to disabled. This can occur after the operating systems 120, 121 in partition A 112 and partition B 113 have been running through normal use of their applications are made known to the operating system by the normal system call process.

The partition control module 111, at step 312, accepts the request to unset the "borrow bit". The partition control module 111 marks the real memory block location with the borrow bit disabled and also updates either a list or pointer to a list removing the address of the page or page range. This indicates that the memory block can no longer be borrowed. The partition control module 111 can also recalculate the total number of pages that can be borrowed in the information processing system 101.

The partition control module 111, at step 314, detects that an event has occurred in one or more of the partitions 113, 114 that requires a recovery action. For example, the partition control module 111 detects that the operating system 121 of Partition B 113 has crashed. The partition control module 111 receives a recovery action request from the dump interrupt handler 209 of Partition B 113. The control flows to entry point A of FIG. 4 so that the partition control module 111 can determine whether to freeze the crashed OS image 121 or to perform normal dumping procedures.

Figure 4:
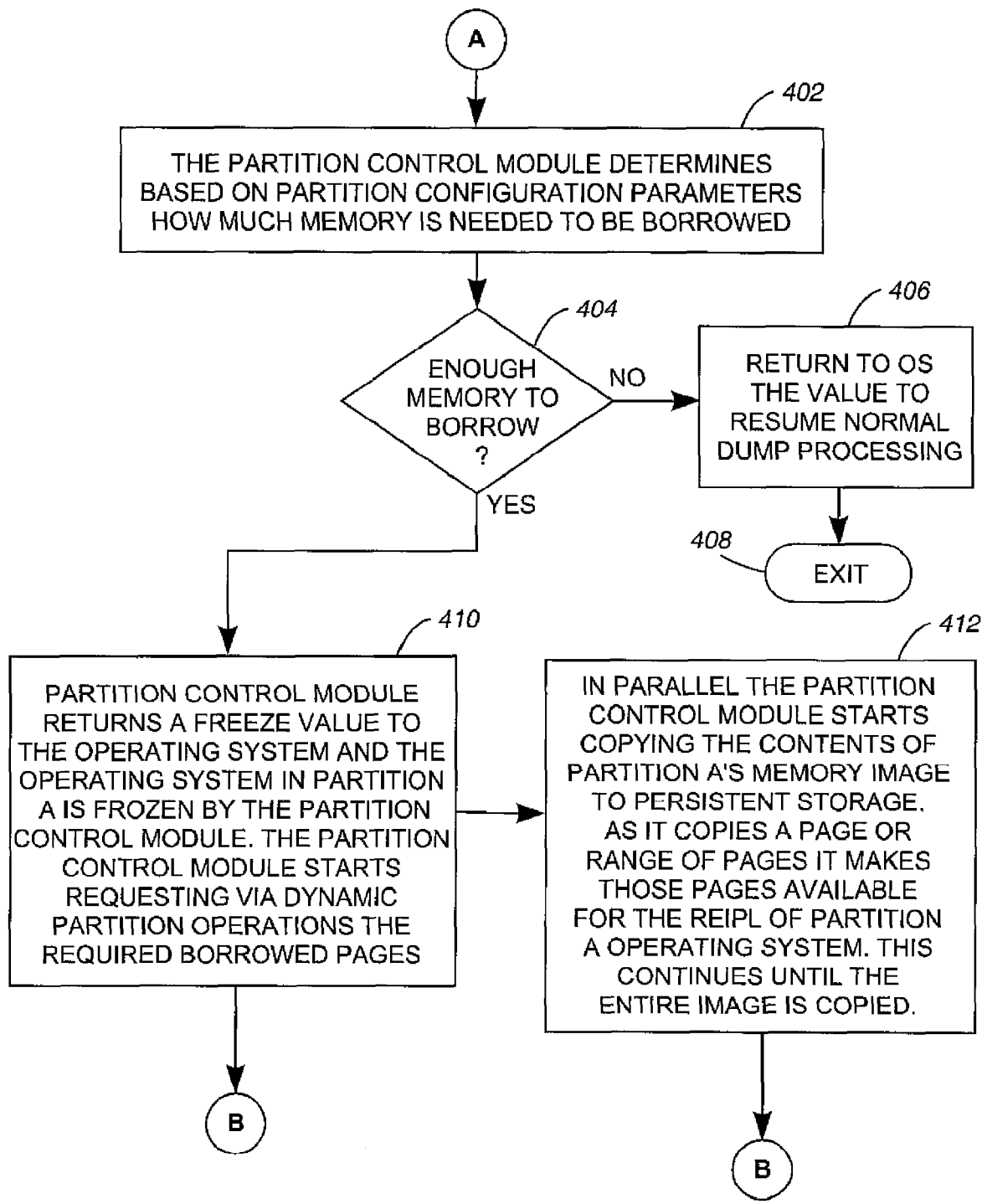
FIG. 4 and FIG. 5 are operational flow diagrams illustrating an exemplary process of performing recovery actions such as a fast system dump and IPL operation in tandem according to an embodiment of the present invention.
Figure 5:
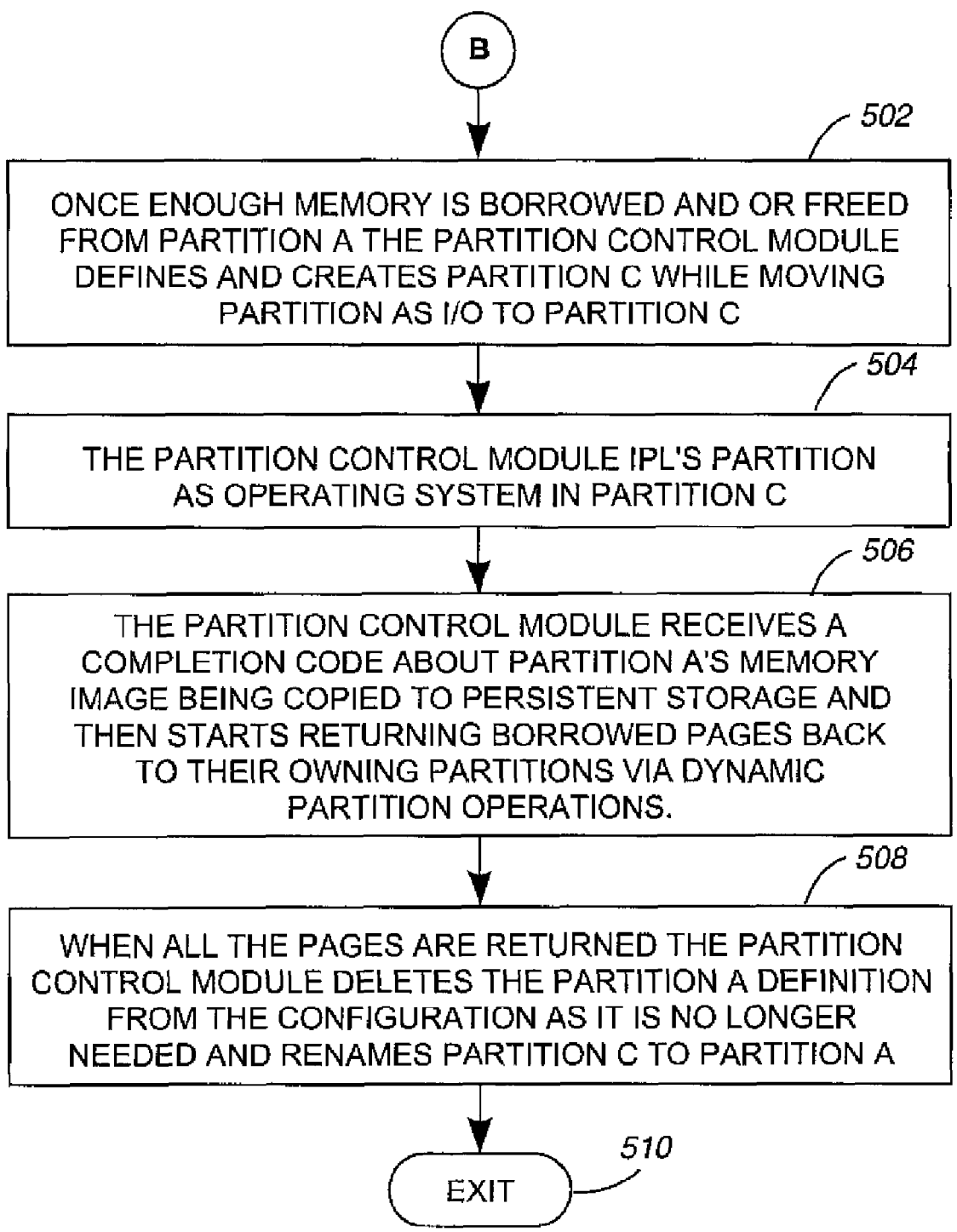

FIG. 4 and FIG. 5 are operational flow diagrams illustrating a process for performing a system dump and IPL operations in parallel. The control flow from FIG. 3 flows into entry point A of FIG. 4. The partition control module 111, at step 402, determines based on how the partition is configured if a fast ipl can be completed. In one embodiment, the partition control module 111 determines how much memory needs to be borrowed for recovering the crashed OS image 121.

The partition control module 111, at step 404, determines if the information processing system 101 comprises enough memory for recovering the crashed OS image 121. If the result of this determination is negative, Partition B 113, at step 406, is notified to use normal dumping procedures. Also, if the partition control module 214 determines that Partition B 113 is not configured for a fast ipl operation, then the partition control module 111 notifies Partition B 113 to perform normal dumping procedures.

If the result of this determination is positive, the partition control module 111, at step 410 returns a freeze value to the crashed OS 121 in Partition B 113 is frozen by the partition control module 111. The partition control module 111 also starts requesting, via dynamic partition operations, the required borrowed pages from other partitions and unused memory space to allocate enough memory to build a new Partition C 114 to IPL partition B's OS 121. The control flows to entry point B of FIG. 5.

In parallel to step 410, the partition control module 111, at step 412, also starts copying the contents of partition B's memory image to persistent storage 104. As it copies a page or range of pages the partition control module 111 makes those pages available for the re-IPL of Partition B's OS 121. As each page or range of pages is copied the partition control module 11 adds those page locations to the available memory for Partition C 114. This continues until the entire image is copied. The control flows to entry point B of FIG. 5.

Once enough memory is available for Partition C 240 to be defined and created, the partition control module 111, at step 502, moves the I/O for Partition A over to Partition C. It should be noted that all the memory for partition C does not need to be available to create the partition, only the minimum required is needed. The partition control module 111, at step 504, IPLs the OS 121 of Partition B 113 in Partition C 114. The partition control module 111, at step 506, receives a completion code about partition B's memory image being copied to persistent storage. The partition control module 111 then starts returning borrowed pages back to their owning partitions via dynamic partition operations. When all the pages are returned, the partition control module 111, at step 508, deletes the partition B definition from the configuration and renames Partition C to Partition A. The control flow exits at step 510.

Non-Limiting Examples

The present invention as would be known to one of ordinary skill in the art could be produced in hardware or software, or in a combination of hardware and software. However in one embodiment the invention is implemented in software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium, which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, on an information processing system, for resource recovery, the method comprising:
    associating at least one bit with at least one block of memory residing in at least one of a first partition and an unused memory area, wherein the bit denotes a borrow status for the block of memory;
    setting the bit for resource recovery;
    detecting a resource recovery event, wherein the resource recovery event is associated with a failing of a second partition;
    performing a system dump of the second partition to persistent storage, wherein the system dump comprises copying a memory image associated with the second partition to a given disk location;
    in response to the bit being enabled for resource recovery, borrowing the block of memory for a given duration of time; and
    performing, in response to the bit being enabled for resource recovery, an initial program load of a new copy of the second partition at a new partition using at least the block of memory that has been borrowed from the one of the first partition and the unused memory area in parallel with copying the memory image associated with the second partition from the second partition to the given disk location.

2. The method of claim 1, wherein performing the system dump further comprises:
    copying each block of memory corresponding to the memory image stored in the second partition to the persistent storage, and
    wherein performing the initial program load at the new partition further comprises
    creating a third partition based on at least one of the block of memory which has been borrowed and memory of additional blocks that have become free from the copying, wherein the creating of the third partition and the copying of each block of memory are performed in parallel.

3. The method of claim 2, further comprising:
    determining that the third partition has been created; and
    transferring at least one of input and output operations associated with the second partition to the third partition.

4. The method of claim 2, further comprising:
    determining that the memory image has been copied over to the persistent storage;
    deleting the second partition;
    renaming the third partition as the second partition; and
    returning the memory block that has been borrowed back to its respective owner.

5. The method of claim 1, wherein the detecting a resource recovery event, further comprises:
    determining an amount of memory required for the resource recovery event;
    in response to an amount of memory that satisfies the amount of memory required for the resource recovery event identified at least in part on the bit set for recovery as not being available, notifying a partition associated with the resource recovery event to perform normal system dump processing; and in response to an amount of memory that satisfies the amount of memory required for the resource recovery event identified at least in part on the bit set for recovery as being available, borrowing the block of memory for a given duration of time.

6. The method of claim 1, wherein the bit is set for resource recovery based on at least one of:
operating system requests;
application configuration; and
system administrator policies.

7. The method of claim 1, wherein the bit can indicate at least one of:
a duration of time that a block of memory can be borrowed; and
a type of resource recovery event for which block of memory is available.

8. An information processing system for resource recovery, the information processing system comprising:
a memory;
a processor communicatively coupled to the memory;
a partition control module communicatively coupled to the memory and the processor, wherein the partition control module performs:
associating at least one bit with at least one block of memory allocated to a first logical partition, wherein the bit denotes a borrow status for the block of memory, and wherein the bit is a data structure control bit that informs a hypervisor associated with the first logical partition if the block of memory is able to be borrowed for a recovery action;
setting the bit for resource recovery;
detecting a resource recovery event, wherein the resource recovery event is associated with a failing of a second logical partition;
performing a system dump of the second logical partition to persistent storage, wherein the system dump comprises copying a memory image associated with the second logical partition to a given disk location;
in response to the bit being enabled for resource recovery, borrowing the block of memory for a given duration of time; and
performing, in response to the bit being enabled for resource recovery, an initial program load of a new copy of the second logical partition at a new logical partition using at least the block of memory that has been borrowed from the first logical partition in parallel with copying the memory image associated with the second logical partition from the second logical partition to the given disk location.

9. The information processing system of claim 8, wherein the partition control module performs the system dump by:
copying each block of memory corresponding to the memory image stored in the second logical partition to the persistent storage, and
wherein the partition control module performs the initial program load at the new partition by
creating a third logical partition based on at least one of the block of memory which has been borrowed and memory of additional blocks that have become free from the copying, wherein the creating of the third logical partition and the copying of each block of memory are performed in parallel, and wherein the third logical partition operates as an independent computer.

10. The information processing system of claim 9, wherein the partition control module further performs:
determining that the third logical partition has been created;
transferring at least one of input and output operations associated with the second logical partition to the third logical partition;
determining that the memory image has been copied over to the persistent storage;
deleting the second logical partition;
renaming the third logical partition as the second logical partition; and
returning the memory block that has been borrowed back to its respective owner.

11. The information processing system of claim 8, wherein the detecting a resource recovery event, further comprises:
determining an amount of memory required for the resource recovery event
in response to an amount of memory that satisfies the amount of memory required for the resource recovery event identified at least in part on the bit set for recovery as not being available, notifying a logical partition associated with the resource recovery event to perform normal system dump processing; and
in response to an amount of memory that satisfies the amount of memory required for the resource recovery event identified at least in part on the bit set for recovery as being available, borrowing the block of memory for a given duration of time.

12. The information processing system of claim 9, wherein the bit is set for resource recovery based on at least one of:
operating system requests;
application configuration; and
system administrator policies.

13. The information processing system of claim 8, wherein the bit can indicate at least one of:
a duration of time that a block of memory can be borrowed; and
a type of resource recovery event for which block of memory is available.

14. A non-transitory computer readable medium for resource recovery, the computer readable medium comprising instructions for performing a method comprising:
associating at least one bit with at least one block of memory residing in at least one of a first partition and an unused memory area, wherein the bit denotes a borrow status for the block of memory;
setting the bit for resource recovery;
detecting a resource recovery event, wherein the resource recovery event is associated with a failing of a second partition;
performing a system dump of the second partition to persistent storage, wherein the system dump comprises copying a memory image associated with the second partition to a given disk location;
in response to the bit being enabled for resource recovery, borrowing the block of memory for a given duration of time; and
performing, in response to the bit being enabled for resource recovery, an initial program load of a new copy of the second partition at a new partition using at least the block of memory that has been borrowed from the one of the first partition and the unused memory area in parallel with copying the memory image associated with the second partition from the second partition to the given disk location.

15. The non-transitory computer readable medium of claim 14, wherein the instructions for performing the system dumb further comprise instructions for:
copying each block of memory corresponding to the memory image stored in the second partition to the persistent storage, and
wherein performing the initial program load at the new partition further comprises
creating a third partition based on at least one of the block of memory which has been borrowed and memory of additional blocks that have become free from the copying, wherein the creating of the third partition and the copying of each block of memory are performed in parallel.

16. The non-transitory computer readable medium of claim 15, further comprising instructions for:
determining that the third partition has been created; and
transferring at least one of input and output operations associated with the second partition to the third partition.

17. The non-transitory computer readable medium of claim 15, further comprising instructions for:
determining that the memory image has been copied over to the persistent storage;
deleting the second partition;
renaming the third partition as the second partition; and
returning the memory block that has been borrowed back to its respective owner.

18. The non-transitory computer readable medium of claim 14, wherein the instructions for detecting a resource recovery event, further comprise instructions for:
determining an amount of memory required for the resource recovery event
in response to an amount of memory that satisfies the amount of memory required for the resource recovery event identified at least in part on the bit set for recovery as not being available, notifying a partition associated with the resource recovery event to perform normal system dump processing; and
in response to an amount of memory that satisfies the amount of memory required for the resource recovery event identified at least in part on the bit set for recovery as being available, borrowing the block of memory for a given duration of time.

19. The non-transitory computer readable medium of claim 14, wherein the bit is set for resource recovery based on at least one of:
operating system requests;
application configuration; and
system administrator policies.

20. The non-transitory computer readable medium of claim 14, wherein the bit can indicate at least one of:
a duration of time that a block of memory can be borrowed; and
a type of resource recovery event for which block of memory is available.

* * * * *